Figure 3:
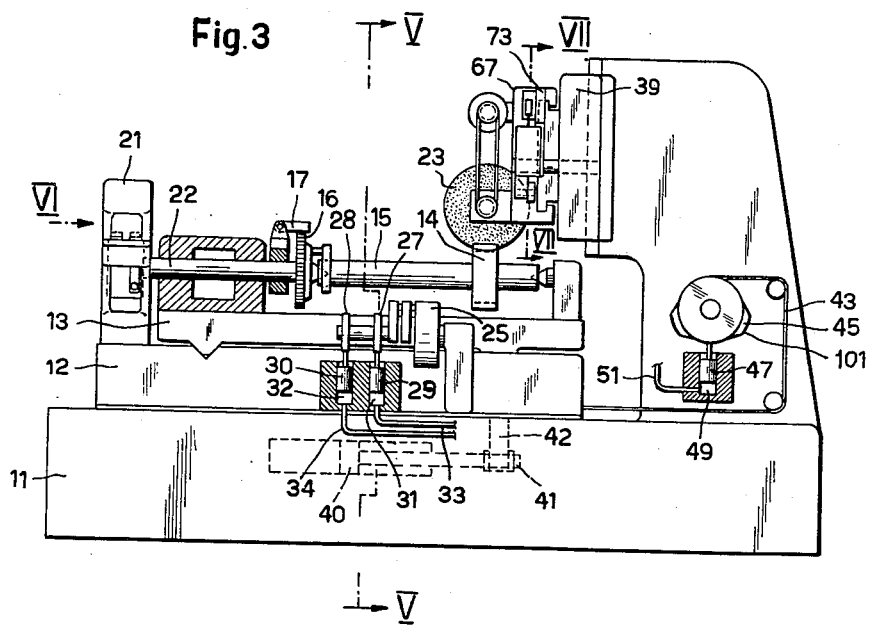

July 17, 1962 W. GRAF 3,044,221
GEAR GRINDING MACHINE
Filed Dec. 4, 1958 3 Sheets-Sheet 1
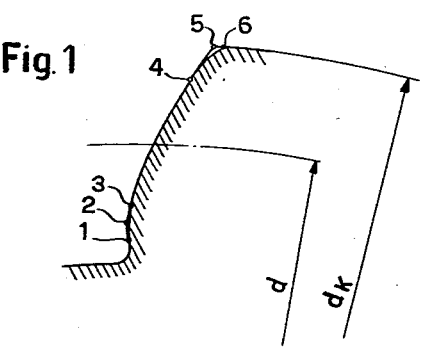
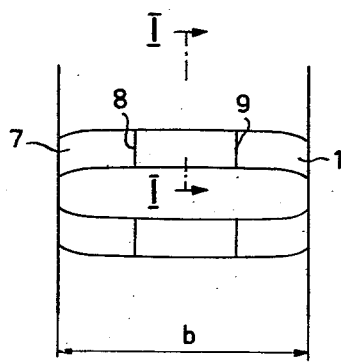
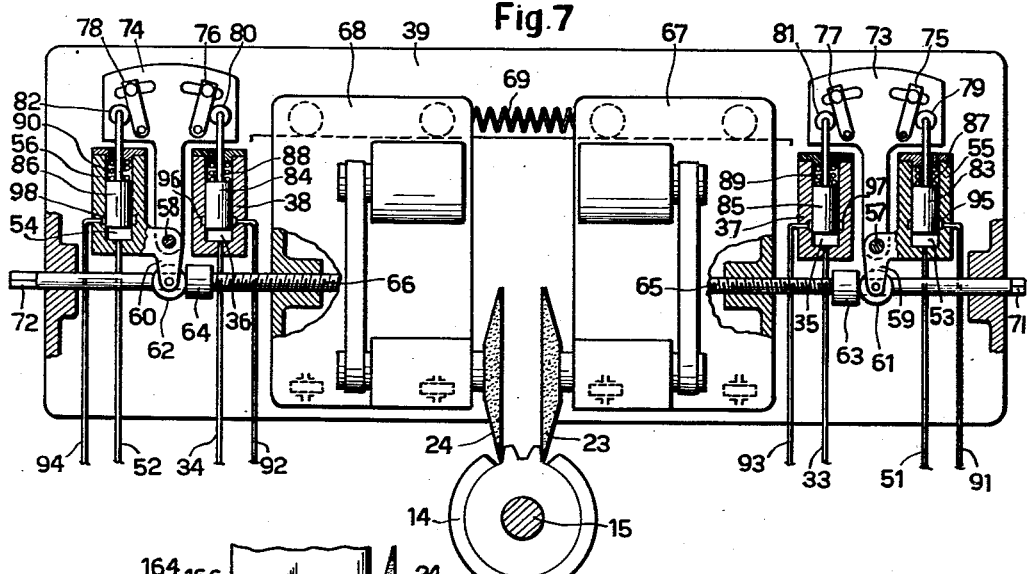
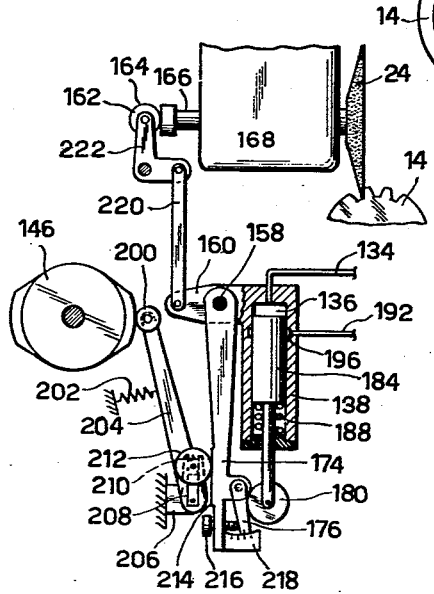
Willi GRAF
INVENTOR
By:
Wenderoth, Lind & Ponack
Attys July 17, 1962  W. GRAF  3,044,221
GEAR GRINDING MACHINE
Filed Dec. 4, 1958  3 Sheets-Sheet 2

Willi GRAF
INVENTOR

By:
Wenderoth, Lind & Ponack
Attys

July 17, 1962 W. GRAF 3,044,221
GEAR GRINDING MACHINE
Filed Dec. 4, 1958 3 Sheets-Sheet 3

Willi GRAF
INVENTOR

United States Patent Office 3,044,221
Patented July 17, 1962

3,044,221
GEAR GRINDING MACHINE
Willi Graf, Zurich, Switzerland, assignor to Maag Gear-Wheel & Machine Company Limited, Zurich, Switzerland
Filed Dec. 4, 1958, Ser. No. 778,223
Claims priority, application Switzerland Dec. 6, 1957
6 Claims. (Cl. 51—123)

The present invention relates to improvements in gear grinding machines for profile corrections and, at right angles thereto, longitudinal crowning of the tooth of the type comprising a grinding disc for each of the right-hand and left-hand tooth flanks of the gear to the ground. Such known machines and the machine disclosed herein operate according to the generating method. The term "profile correction" defines a certain partial reduction or relief of the tooth curve with a view, for example of tip and/or root relief. The term "longitudinal crowning" defines a zonewise reduction of the tooth end portions. Thereby is avoided, for example upon deformation of the pinion under load, a high strain in the tooth ends.

In known gear grinding machines of this type has been used a transmission of movement between the two templates for profile correction and crowning on one hand and one of the grinding discs on the other hand to effect the desired reduction of tooth profile and tooth end portions with respect to the theoretical shape; but such arrangement is relatively complicated and expensive. Furthermore, the long transmission due to the different position of the initial movements for profile correction and crowning, entails a certain loss of accuracy and thus an uncertainty as to the magnitude of the flank reduction which per se, is very small and has to be strictly adhered to. A further aggravating factor is the fact that the transmission acts from each of the four templates on to a separate mechanism for profile correction and crowning. Although such arrangement appears to be in order on account of the fundamental independence of the two relieving or crowning operations, the separate mechanisms also contribute to a complicated synthesis of the transmission of movement. Aggravating are also the great number of moving parts required for a gear grinding machine comprising two grinding discs and operating according to the generating principle.

Said disadvantages are eliminated by the invention in that the two templates for the two correcting operations on one tooth flank of the gear to be ground act on a common mechanism which controls the additional movement of one of the two grinding discs. It also is of advantage when the common mechanism comprises a lever system in which the movement derived from one template acts on a lever which is supported on an element of the mechanism for transmitting the movement from the other template.

Figure 4:
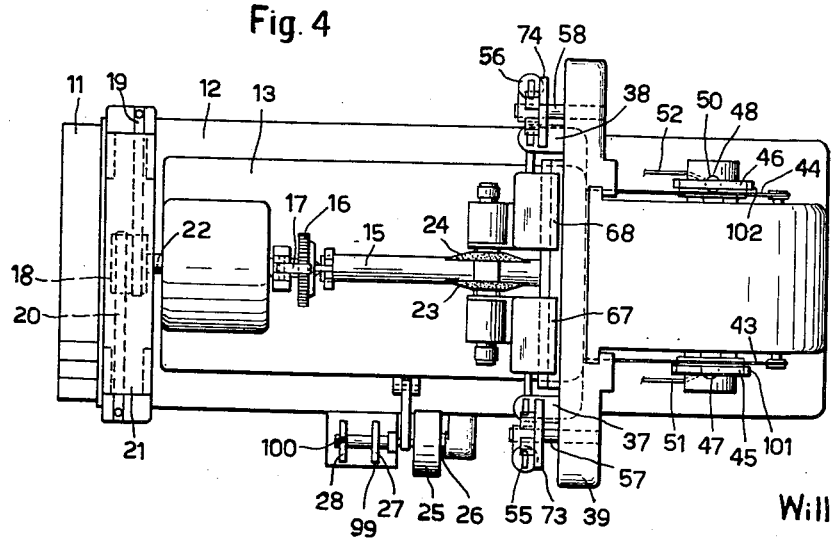
Figure 5:
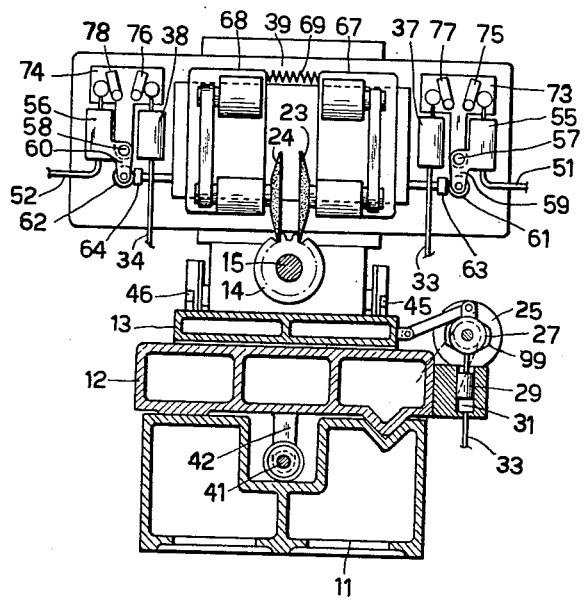
Figure 6:
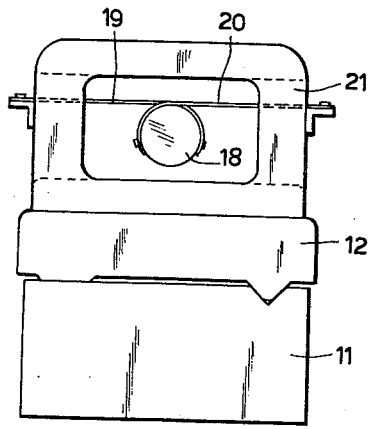

Two forms of the invention are shown in the drawings, in which FIG. 1 depicts in exaggerated form the corrected tooth curve as deviation from the theoretical involute form and illustrates the section I—I of FIG. 2; FIG. 2 shows the crowned tooth end portions in exaggerated form in a top plan view; FIG. 3 illustrates the machine disclosed herein in a side view, various details, however, being shown in section; FIG. 4 shows the machine in plan; FIG. 5 depicts a cross-section on the line V—V of FIG. 3; FIG. 6 is an elevation of the generating mechanism, seen in direction of the arrow VI in FIG. 3; FIG. 7 shows the crossbeam with the grinding-disc supports, similar to FIG. 5 but in a larger scale and partly in section on the line VII—VII of FIG. 3; FIG. 8 depicts a modification of the parts shown in FIG. 7.

FIGS. 1 and 2 depict the production of the profile correcting and crowning operations which, per se, are both known in the art and represent an intentional deviation from the theoretically correct involute form of the tooth flanks. In these two operations, certain zones of the tooth flanks are reduced or relieved. In the tooth cross-section shown in FIG. 1, the pitch circle is designated by $d$ and the addendum circle by $d_k$. The theoretically correct involute profile commences at point 2 and ends at point 5. The profile relief in a root zone from point 1 to 3 and in an addendum zone from point 4 to 6 has for its object the realization of tip and root relief. In FIG. 2, $b$ denotes the face width, the intermediate zone from line 8 to line 9 corresponding, in the intermediate profile portion 3 to 4, to the theoretically correct position of the tooth flank. The zones 7 to 8 and 9 to 10 retreat more and more towards the tooth end and in relation to the theoretical position. In practice, the delimitations as shown by the lines 8 and 9 cannot be accurately localized and merge into each other.

The assembly of the machine is shown in FIGS. 3 to 7 and, in a modification, from FIG. 8. On bed 11 of the tooth grinding machine is mounted slide 12 longitudinally movable and carries cross-slide 13. On the latter is mounted gear 14 to be ground which sits on shaft 15. Shaft 15 is connected via an indexing attachment 16 and 17 to the rolling elements which comprise the rolling cylinder 18 and the steel tapes 19 and 20 slung about same and secured thereto. The other ends of the two steel tapes 19 and 20 are retained by a yoke 21 which is mounted on slide 12. When slide 13 is moved crosswise on slide 12, cylinder 18 rolls off on the taut rolling tapes 19 and 20 and turns shaft 22 which via index lever 17, index gear 16 and work-holding shaft 15 is connected to blank 14 and imparts thereto the desired generating motion with respect to the two grinding discs 23 and 24. The cross-movement of slide 13 is produced by a crank drive 25 which is operated by a crankshaft 26, the details of such drive being not further shown. On crankshaft 26 are mounted two templates 27 and 28 in the form of cam discs which actuate pistons 29 and 30. The respective piston chambers 31 and 32 via two pressure lines 33 and 34 communicate with piston chambers 35 and 36 of housings 37 and 38 which are mounted on a crossbeam 39. The two pressure lines 33, 34 represent the hydraulic path as connection of the two pistons 29, 85 and, respectively, 30 and 84. The drive of slide 12 for grinding the tooth flanks across the face width, is derived from a piston 40 which receives pressurized oil via a hydraulic drive, not shown, and transmits the movement via piston rod 41 and bracket 42 on to slide 12. The straps 43 and 44 are connected with the two templates 45 and 46 which are formed as cam discs and are also connected with the slide 12 so that the templates rotate back and forth in rhythm with the back and forth movement of the slide 12. Said templates 45, 46 act on pistons 47, 48 of which the pressure chambers 49, 50 via pressure lines 51, 52 are connected to piston chambers 53, 54 (FIG. 7) and effect the hydraulic connection between the two pistons 47, 83 and 48, 86 respectively. The housings 55, 56 which comprise piston chambers 53, 54 are pivoted on axles 57, 58 to crossbeam 39. The housings 55, 56 are each provided with an arm 59, 60 which axially moves grinding disc 23 and 24 respectively, via rollers 61, 62 of said arms 59 and 60, sleeves 63 and 64, and thereby move the grinding spindle carriers 67 and 68 respectively. The latter are movable on crossbeam 39 and suitably loaded in the direction of movement by an additional force which acts unidirectionally on the carriers and is represented by a spring 69. The spindles 65, 66 may be constructed as shown in FIG. 7 in that they are provided with extensions 71 and 72 and used for manual setting of the roller-mounted grinding-spindle carriers.

Apart from housing 55 on one side and housing 56 on the other side of crossbeam 39, also an arm 73 and 74 is mounted on axle 57 and 58 respectively. Each of the two arms 73, 74 possesses an angularly adjustable member 75, 77 and 76, 78 respectively, which are tightened by clamping means on arm 73 and 74 respectively. The active face of member 75 thereby contacts a roller 79 which is related to a piston 83 of housing 55. Similarly, the active face of member 77 contacts a roller 81 related to a piston 85 of housing 37. In like manner, the active faces of members 76 and 78 are related to the rollers 80, 82 of the pistons 84, 86 which slide in the housings 38 and 56. The pistons 83 to 86 through the respective piston springs 87 to 90 are pressed against the liquid pressure of the liquid present in the piston chambers 35, 36, 53 and 54.

In each of the housings 37, 48, 55 and 56 is provided an annular groove 95 to 98 which in terminal position of the pistons 83 to 86 returns the oil which has been supplied through the pressure lines 33, 34, 51 and 52, through the lines 91 to 94 back into the oil reservoir.

The mode of operation of the machine is derived from the movement of the two templates 27, 28 for profile correction, which movement is synchronous with the generating movement of slide 13, and from the movement of the two templates 45, 46 for crowning, which movement is synchronous to the longitudinal movement of slide 12. The templates 27, 45 are destined for determining the rate of reduction of single zones of the right-hand tooth flanks, while the templates 28, 46 are destined for determining the rate of reduction of single zones of the left-hand tooth flanks of the gear to be ground.

By reason of the difference between the radial distances of the contour of template 27, piston 29 is moved during the generating movement of slide 13, and the oil pumped as known by a pump into piston chamber 31, is forced by the downward piston movement through the line 33 (FIGS. 3, 5 and 7) into piston chamber 35. Piston 85 thereby is moved upwardly in housing 37 and swings arm 73 through roller 81 and member 77 clockwise on axle 57. Grinding disc 23 thereby is moved slightly to the left through grinding spindle carrier 67 and via threaded spindle 65, sleeve 63, roller 61 and arm 59 of housing 55, whereby more material is ground off from the right-hand tooth flank than would correspond to the generating movement without the axial movement of the described grinding disc. By dimensioning the template in accordance with the ratios between the template radial distances and the axial movement of the grinding disc at a certain position of the angularly adjustable members 75, 77 and 76, 78 respectively, the rate of reduction of the flanks relatively to the theoretical position may be determined. When one of the members 75 to 78 is angularly adjusted, the ratio is influenced, and thus the magnitude of the respective movement and thereby the rate of relieving may be set steplessly. The position of the zones to be reduced on the tooth flank may be determined by the position of the swells or rises on the template in the peripheral direction and with respect to the generating movement.

A peak 99 at a point of template 27 which corresponds to a generating position of grinding disc 23 with respect to the tooth beyond addendum circle $d_k$ or respectively, outside of point 6 (FIG. 1) gives origin to a further movement of grinding disc 23 as well as of piston 85 into a terminal position which, however, is limited by an annular groove 97. By a small excess or over-dosage of the oil quantity in this extreme position and by a corresponding slight superelevation of point 99 on the template, it is ensured that also in case of certain leakages in the lines there is always enough oil between the co-operating pistons 29, 85 which are connected by a single pressure line 33, and that in the extreme position the piston 85 at each rolling movement or, respectively, at each stroke moves into a definite absolute position, i.e. is gauged.

In a manner similar to, the partial reduction or relief of the right-hand tooth flanks, the reduction or relief of individual portions of the left-hand tooth flanks of the gear to be ground is effected via template 28, piston 30, the liquid in piston chamber 32, in line 34 and in piston chamber 36, piston 84, roller 80, member 76, arm 74, axle 58, arm 60, roller 62, socket 64, threaded spindle 66, grinding disc carrier 68 and grinding disc 24. Gauging is effected here through a peak 100 of template 28, analogous to peak 99 on template 27.

Independently of the reduction described above of individual tooth-curve portions, such as for tip and root relief, the following description explains the reduction of individual zones of tooth flanks with respect to the face width, for the purpose of avoiding edge pressure engagement. The arrangement according to the invention does not exclude the combination of tip and root relief and crowning as used in most cases.

By reason of the different radial distances of the contour of template 45, piston 47 is moved during the longitudinal movement of slide 12, and the oil supplied, in known manner, into piston chamber 49 is forced by the downward piston movement through line 51 (FIGS. 3 to 5 and 7) into piston chamber 53. Piston 83 thereby is move upwardly against the pressure of spring 87, and roller 79 moves along member 75 which is secured to arm 73. Since the latter, however, is supported on roller 81 through member 77, housing 55 is turned clockwise on axle 57, whereby arm 59 via roller 61, sleeve 63, and threaded spindle 65 moves grinding spindle 67 and, thus, also grinding disc 23 axially to the left. Thereby more material is ground off from the right-hand tooth flank in certain zones than would correspond to the position of the grinding disc occupied till now. The rate of this additional abrasion is given by the radial difference of the template. The position of the zones of reduced profile with respect to the face width $b$ depends on the position of the rises or swells of the template in the circumferential direction and on the existing position of the grinding discs with respect to the gear to be ground and the position thereof relatively to slide 12.

A peak 101 on template 45, located at a point corresponding to the position of the grinding disc beyond the face width $b$ (FIG. 2), gives origin to a further displacement of grinding disc 23 to the left. At the same time, however, also piston 83 is raised so far that the pumped pressurized oil may flow out of piston chamber 53 into recess 95 of housing 55 and thence into the reservoir. By a slight excess or over-dosage of the oil quantity for this terminal position of piston 83, eventual leakage is compensated at each stroke of slide 12 and simultaneously the position of piston 83 is gauged at each stroke.

In like manner, the partial reducing or crowning of the left-hand tooth flanks is effected via template 46, piston 48, the oil in piston chamber 50 and line 52 and piston chamber 54, piston 86, roller 82, member 78, housing 56 through axle 58 on to arm 60, roller 62, socket 64, threaded spindle 66, grinding-spindle carrier 68 and through the axial movement of grinding disc 24. Gauging in this case is effected by the peak 102 and the position of recess 98.

A modification for solving the inventive idea is shown in FIG. 8 in which is shown only the machining of the left-hand tooth flanks and the corresponding adaptation of the means in lieu of the means shown in FIG. 7. The right-hand tooth flanks are machined by elements which are disposed symmetrically with respect to the means shown. The lower portion of bed 11 is otherwise identical with the illustration in FIGS. 3 to 6. The template 146, formed as a cam disk, takes the function of the template 46 shown in FIGURE 4, but is mounted on the cross bar 39. Its to and fro rotating movement is by a mechanical connection connected with the to and fro movement of the slide 12. The radial differences on the circumference of the template give rise, via roller 200, to a swinging movement of arm 204 and of the slotted piece 208 fixed thereto. Arm 204 is drawn against template 146 by spring 202 and is mounted on the crossbeam by means of a pedestal 206. In slotted piece 208 is guided a sliding block 210 which carries a roller 212, the spacing between the roller axle and the pivot axis of arm 204 being adjustable by means not shown but in known manner. Roller 212 contacts a plane 214 which extends substantially radially with respect to the swing axle 158 of arm 174. Axle 158 is secured to crossbeam 39 and is functionally identical with axle 58 of FIGS. 5 and 7. To arm 174 is pivoted a member 176, the rate of swing being adjustable through a set screw 216 and readable on a scale 218 as size of the tip and root relief. A roller 180 which is connected to a piston 184 contacts the active face of member 176. Piston 184 is pushed upwardly in the piston housing 138 by a spring 188 and against the liquid pressure prevailing in piston chamber 136. The latter via a pressure line 134 communicates with piston chamber 32 of piston 30 and thus is directly related to template 28 which rotates synchronously with the to-and-fro rolling movement and gives origin to the profile reduction of the left-hand tooth flanks. An annular groove 196, executed as recess in the bore of housing 138, communicates with an oil drain 192, i.e. with the oil reservoir. Housing 138 is pivoted on axle 158 and also carries a lever 160. The latter via a link 220, a bell crank 222 pivoted to crossbeam 39, and a roller 162 is connected to a sleeve 164, a threaded spindle 166, and, further, via the grinding-spindle carrier 168 to the axially movable grinding disc 24 which grinds the left-hand tooth flanks of the gear to be ground. The function of this modification shown in FIG. 8 is derived from said rotary movement of template 146 which is synchronous with the longitudinal movement of slide 12. The rate of radial differences along the periphery of template 146 defines the rate of swing of arm 204, the swinging movement transmitted on to arm 174 being dependent on the set spacing between the pivotal center of arm 204 and the center of roller 212, and the rate of crowning being steplessly regulable through the radial setting of roller 212. Arm 174 via member 176 and roller 180 abuts against housing 138 and thereby transmits the swinging movement via lever 160, link 220, bell crank 222 and roller 162 on to sleeve 164. By angularly adjusting the member 176, the rate of relief may be steplessly varied. Said swinging movement of bell crank 222 via grinding-spindle carrier 168 is directly related to the axial position of grinding disc 24. A deflection of roller 200 by template 146 thus corresponds to a deviation of the left-hand theoretical flank. When the grinding spindle does not move axially, said flank forms a straight line when developed in a plane.

When piston 184 and thus also roller 180 is moved, in accordance with the deflection of piston 30 by the rotation of template 28 in dependency on the rolling movement of slide 13, via pressure line 34 and pressure line 134 connected thereto, such movement through the support of roller 180 on the active face of member 176 is transformed into a swinging movement of housing 138, whereby sleeve 164 and the threaded spindle 166 are axially moved via lever 160, link 220, bell crank 222 and roller 162. Thereby grinding disc 24 also is axially moved and the left-hand profile is altered with respect to the theoretical involute shape, since the profile is generated involute-like by the action of the generating mechanism when the grinding disc is axially immovable.

The construction according to FIG. 7 and the modification according to FIG. 8 and particularly the alternating support of the rollers influenced by the templates on the active face of the pivotable members (as shown in FIG. 7) provides not only a common device for controlling the deflections for a reduction of the tooth-curve and tooth flank, i.e. tip and root relief and crowning by means of the additional grinding-disc movements depending on the rolling and longitudinal movement, but these movements which depend on the rolling and longitudinal movement may also be combined with each other and independent of each other as desired. Thereby it is made possible to retract such a corrected profile as a whole also across the face width. On the right-hand tooth flank, the common device of the construction shown in FIG. 7, on to which act the templates 27 and 45 for the tip and root relief and crowning features, comprises the following parts and units: arm 73 with the two angularly adjustable members 75 and 77, the two rollers 79, 81 with the appurtenant pistons 83, 85 and the springs 87, 89 and the housings 37 and 55, further the arm 59 and the axle 57. The common device on the left-hand tooth flank comprises the arm 74 with the two angularly adjustable members 76 and 78, the two rollers 80 and 82, the pistons 84 and 86, the springs 88 and 90, the housings 38 and 56, the lever 60 and the axle 58.

The lever system of the common device comprises the arm 73 and the arm 59 which is integral with housing 55. The movement derived from the tip and root relief template 27 acts through roller 81 on to member 77 of arm 73 and is supported through member 75 on roller 79, i.e. an element of the mechanism for transmitting the movement for the crowning operation.

The common device in the construction of FIG. 8, on to which act the relief and the crowning templates 28 and 146 on one tooth flank, comprises arm 204 with slotted piece 208 and roller 212, arm 174 with member 176, roller 180 with piston 184 and spring 188, housing 138 with lever 160, and axle pin 158.

In this latter case, the lever system of the common device comprises arm 174 and lever 160 which is integral with housing 138. The movement derived from the relief template 28 acts through roller 180 on to member 176 and, through arm 174 and active face 214 thereof, on to roller 212 which is an element of the mechanism for the transmission of the crowning movement.

What I claim as new and desire to secure by Letters Patent is:

1. A gear grinding machine comprising a bed, a first slide movable longitudinally of said bed, a second slide movable transversely on said first slide, means for moving said slides, a shaft for supporting a gear workpiece mounted on said second slide, a pair of grinding discs, supports for said discs slidable transversely of said bed for movement toward and from a tooth flank, means for operating said grinding discs, means for generating a normal involute movement to said workpiece relative to said grinding discs, a first template controlling the profile correction upon the right hand tooth flank of said gear workpiece movable synchronously with the generating movement of said second slide, a second template controlling the crowning correction upon said right hand tooth flank movable synchronously with the longitudinal movement of said first slide, a third template controlling the profile correction upon the left hand tooth flank of said workpiece movable synchronously with the generating movement of said second slide, a fourth template controlling the crowning correction upon the left hand tooth flank movable synchronously with the longitudinal movement of said first slide, a first common means controlled by said first and second templates for moving one of said discs to accomplish the profile and crowning corrections on the right flank of a tooth of said workpiece and a second common means controlled by said third and fourth templates for accomplishing the same corrections on the left flank of a tooth, hydraulic transmissions extending from said first and second templates to said first common means and hydraulic transmissions extending from said third and fourth templates to said second common means.

2. A gear grinding machine comprising a bed, a first slide movable longitudinally of said bed, a second slide movable transversely on said first slide, means for moving said slides, a shaft for supporting a gear workpiece mounted on said second slide, a pair of grinding discs, supports for said discs slidable transversely of said bed for movement toward and from a tooth flank, means for operating said grinding discs, means for generating a normal involute movement to said workpiece relative to said grinding discs, a first template controlling the profile correction upon the right hand tooth flank of said gear workpiece movable synchronously with the generating movement of said second slide, a second template controlling the crowning correction upon said right hand tooth flank movable synchronously with the longitudinal movement of said first slide, a third template controlling the profile correction upon the left hand tooth flank of said workpiece movable synchronously with the generating movement of said second slide, a fourth template controlling the crowning correction upon the left hand tooth flank movable synchronously with the longitudinal movement of said first slide, a first common means controlled by said first and second templates for moving one of said discs to accomplish the profile and crowning corrections on the right flank of a tooth of said workpiece, a second common means controlled by said third and fourth templates for accomplishing the same corrections on the left flank of a tooth, hydraulic transmissions extending from said first and second templates to said first common means, hydraulic transmissions extending from said third and fourth templates to said second common means, and a cylinder containing a piston actuated by each of said templates to control the common means associated therewith through its associated transmission.

3. A gear grinding machine comprising a bed, a first slide movable longitudinally of said bed, a second slide movable transversely on said first slide, means for moving said slides, a shaft for supporting a gear workpiece mounted on said second slide, a pair of grinding discs, supports for said discs slidable transversely of said bed for movement toward and from a tooth flank, means for operating said grinding discs, means for generating a normal involute movement to said workpiece relative to said grinding discs, a first template controlling the profile correction upon the right hand tooth flank of said gear workpiece movable synchronously with the generating movement of said second slide, a second template controlling the crowning correction upon said right hand tooth flank movable synchronously with the longitudinal movement of said first slide, a third template controlling the profile correction upon the left hand tooth flank of said workpiece movable synchronously with the generating movement of said second slide, a fourth template controlling the crowning correction upon the left hand tooth flank movable synchronously with the longitudinal movement of said first slide, a first common means controlled by said first and second templates for moving one of said discs to accomplish the profile and crowning corrections on the right flank of a tooth of said workpiece, a second common means controlled by said third and fourth templates for accomplishing the same corrections on the left flank of a tooth, a piston reciprocating in a cylinder actuated by each template and a hydraulic transmission interconnecting each cylinder with its coordinated common means and means for draining hydraulic fluid above a predetermined amount in said cylinders.

4. A gear grinding machine comprising a bed, a first slide movable longitudinally of said bed, a second slide movable transversely on said first slide, means for moving said slides, a shaft for supporting a gear workpiece mounted on said second slide, a pair of grinding discs, supports for said discs slidable transversely of said bed for movement toward and from a tooth flank, means for operating said grinding discs, means for generating a normal involute movement to said workpiece relative to said grinding discs, a first template controlling the profile correction upon the right hand tooth flank of said gear workpiece movable synchronously with the generating movement of said second slide, a second template controlling the crowning correction upon said right hand tooth flank movable synchronously with the longitudinal movement of said first slide, a third template controlling the profile correction upon the left hand tooth flank of said workpiece movable synchronously with the generating movement of said second slide, a fourth template controlling the crowning correction upon the left hand tooth flank movable synchronously with the longitudinal movement of said first slide, a first common means controlled by said first and second templates for moving one of said discs to accomplish the profile and crowning corrections on the right flank of a tooth of said workpiece, a second common means controlled by said third and fourth templates for accomplishing the same corrections on the left flank of a tooth, and each of said common means having an arm with an angularly adjustable member on which acts the movement derived from one of said templates to steplessly adjust in size the axial movement of one of said grinding discs corresponding to a definite stroke of the template associated therewith.

5. A gear grinding machine comprising a bed, a first slide movable longitudinally of said bed, a second slide movable transversely on said first slide, means for moving said slides, a shaft for supporting a gear workpiece mounted on said second slide, a pair of grinding discs, supports for said discs slidable transversely of said bed for movement toward and from a tooth flank, means for operating said grinding discs, means for generating a normal involute movement to said workpiece relative to said grinding discs, a first template controlling the profile correction upon the right hand tooth flank of said gear workpiece movable synchronously with the generating movement of said second slide, a second template controlling the crowning correction upon said right hand tooth flank movable synchronously with the longitudinal movement of said first slide, a third template controlling the profile correction upon the left hand tooth flank of said workpiece movable synchronously with the generating movement of said second slide, a fourth template controlling the crowning correction upon the left hand tooth flank movable synchronously with the longitudinal movement of said first slide, a first common means controlled by said first and second templates for moving one of said discs to accomplish the profile and crowning corrections on the right flank of a tooth of said workpiece, a second common means controlled by said third and fourth templates for accomplishing the same corrections on the left flank of a tooth, each of said common means having an arm with two angularly adjustable members on which act the movements derived from the templates associated therewith to steplessly and independently adjust the axial movement of the grinding disc associated therewith corresponding to a definite stroke of the templates associated with said grinding disc.

6. A gear grinding machine comprising a bed, a first slide movable longitudinally of said bed, a second slide movable transversely on said first slide, means for moving said slides, a shaft for supporting a gear workpiece mounted on said second slide, a pair of grinding discs, supports for said discs slidable transversely of said bed for movement toward and from a tooth flank, means for operating said grinding discs, means for generating a normal involute movement to said workpiece relative to said grinding discs, a first template controlling the profile correction upon the right hand tooth flank of said gear workpiece movable synchronously with the generating movement of said second slide, a second template controlling the crowning correction upon said right hand tooth flank movable synchronously with the longitudinal movement of said first slide, a third template controlling the profile correction upon the left hand tooth flank of said workpiece movable synchronously with the generating movement of said second slide, a fourth template controlling the crowning correction upon the left hand tooth flank movable synchronously with the longitudinal movement of said first slide, a first common means controlled by said first and second templates for moving one of said discs to accomplish the profile and crowning corrections on the right flank of a tooth of said workpiece, a second common means controlled by said third and fourth templates for accomplishing the same corrections on the left flank of a tooth, each of said common means for moving said grinding discs comprising a pair of cylinders and cooperating pistons, each of said pistons being controlled in its movement by a template associated therewith, one of said cylinders being pivotally mounted and having a lever for moving the associated grinding disc and a pivotally mounted plate under the control of both pistons for controlling the pivoting of said pivotally mounted cylinder.

References Cited in the file of this patent
UNITED STATES PATENTS
2,879,630     Aeppli  ---------------- Mar. 31, 1959